United States Patent
Endo et al.

(10) Patent No.: US 10,533,110 B2
(45) Date of Patent: Jan. 14, 2020

(54) COATING COMPOSITION, AND SUPER WATER-REPELLENT FILM

(71) Applicant: Dexerials Corporation, Tokyo (JP)

(72) Inventors: Ryosuke Endo, Tokyo (JP); KyungSung Yun, Tokyo (JP); Hirofumi Kondo, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 176 days.

(21) Appl. No.: 15/527,885

(22) PCT Filed: Oct. 26, 2015

(86) PCT No.: PCT/JP2015/080107
§ 371 (c)(1),
(2) Date: May 18, 2017

(87) PCT Pub. No.: WO2016/080152
PCT Pub. Date: May 26, 2016

(65) Prior Publication Data
US 2018/0327626 A1    Nov. 15, 2018

(30) Foreign Application Priority Data
Nov. 21, 2014 (JP) .................. 2014-236754

(51) Int. Cl.
| | | |
|---|---|---|
| *C09D 133/16* | (2006.01) | |
| *C09D 7/40* | (2018.01) | |
| *C09D 7/62* | (2018.01) | |
| *C08F 220/22* | (2006.01) | |
| *C08K 3/36* | (2006.01) | |
| *C09D 4/00* | (2006.01) | |
| *C09D 5/00* | (2006.01) | |
| *C08K 9/06* | (2006.01) | |

(52) U.S. Cl.
CPC .......... *C09D 133/16* (2013.01); *C08F 220/22* (2013.01); *C08K 3/36* (2013.01); *C09D 4/00* (2013.01); *C09D 5/00* (2013.01); *C09D 7/40* (2018.01); *C09D 7/62* (2018.01); *C08K 9/06* (2013.01)

(58) Field of Classification Search
CPC ..................................... C09D 133/16
See application file for complete search history.

(56) References Cited

U.S. PATENT DOCUMENTS

2013/0084458 A1    4/2013 Yamada et al.

FOREIGN PATENT DOCUMENTS

| | | | |
|---|---|---|---|
| JP | 2003-119457 | 4/2003 | |
| JP | 2008-075064 | 4/2008 | |
| JP | 2009-051921 | 3/2009 | |
| JP | 2012-201799 | 10/2012 | |
| JP | 2014-030910 | 2/2014 | |
| JP | 2014-173067 | 9/2014 | |
| WO | 2014022363 | 2/2014 | |
| WO | WO-2014022363 A2 * | 2/2014 | ............ C09D 4/00 |

OTHER PUBLICATIONS

Dowanol Technical Data Sheet, Dow Chemical Company, 2012.*
Masaya Hikita, Keiji Tanaka, Tetsuya Nakamura, Atsushi Takahara and Tisato Kajiyama, Transparent Super-Hydrophobic Coatings Based on Fluoroalkylsilane-Silica Hybrid Materials, Surface Science Journal, Mar. 3, 2005; Jun. 14, 2005, pp. 559-563, vol. 26, No. 9, Japan Chemical Innovation Institute, Japan.

* cited by examiner

*Primary Examiner* — Michael F Pepitone
(74) *Attorney, Agent, or Firm* — Carmody Torrance Sandak & Hennessey LLP

(57) ABSTRACT

A coating composition including the following five components 1) to 5):
1) a fluorine-containing multifunctional (meth)acrylate;
2) a binder component that is free of fluorine and reacts with the 1) component;
3) metal oxide nanoparticles each including an organic group on a surface thereof;
4) a solvent having a total $(\delta P+\delta H)$ of 8 MPa$^{1/2}$ or more, the total $(\delta P+\delta H)$ being a total of a polar term $\delta P$ and a hydrogen bond term $\delta H$ in Hansen solubility parameters; and
5) a reaction initiator.

15 Claims, No Drawings

COATING COMPOSITION, AND SUPER WATER-REPELLENT FILM

TECHNICAL FIELD

The present invention relates to a coating composition and a superhydrophobic film (super water-repellent film).

BACKGROUND ART

Conventionally, there has been developed a film-like product, which is obtained by coating a material having a hydrophobicity on a solid material (e.g., metallic materials, ceramic materials, glass materials, and resin materials), to impart functions (e.g., antifouling property and self-cleaning ability) as well as hydrophobicity to the material.

These hydrophobic materials can be used in various fields (e.g., window glass, automobile bodies, panels of solar cells, traffic signals, and playground equipment in the park) and can reduce or omit maintenance of cleaning.

Particularly, a so-called "superhydrophobicity" which means a contact angle with respect to water is 150° or more, is advantageous because it exhibits drastically improved functions described above compared to the general hydrophobicity.

It has been known that a coated film exhibiting this "superhydrophobicity" is obtained by formation methods such as sol-gel methods (see, for example, NPL 1). However, the sol-gel methods have been problematic in terms of production as described below. For example, when a formulation solution is left to stand before coating, reaction proceeds as time passes, resulting in the gelatinized solution. In addition, after coating, some reaction conditions of high temperature and long time are required.

On the other hand, there has been known the following method in order to obtain the hydrophobic coating including an acrylic resin and fine particles.

(i): a hydrophobic coating obtained by dissolving an acrylic resin in an organic solvent with fine particles mixed and incorporating ethylene glycol or polyethylene glycol thereinto (see, for example, PTL 1). In this technique, it is described that fluorine is incorporated into a main chain or a side chain of the acrylic resin.

CITATION LIST

Patent Literature

PTL 1; Japanese Patent Application Laid-Open (JP-A) No. 2008-75064 Non Patent Literature
NPL 1; SURFACE SCIENCE Vol. 26, No. 9, pp. 559-563, 2005

SUMMARY OF INVENTION

Technical Problem

However, the hydrophobic coating of the above (i) may have favorable hydrophobicity but is not said to have sufficient "durability of hydrophobicity"; i.e., ability to maintain "superhydrophobicity" even after the durability test.

It has been difficult to obtain a coating that has both "superhydrophobicity" and "durability of hydrophobicity"; i.e., an ability to maintain the "superhydrophobicity" even after the durability test.

The present invention solves the conventionally existing problems and aims to achieve the following object. That is, an object of the present invention is to provide a coating composition that can form a coated film excellent in "superhydrophobicity" and "durability of hydrophobicity".

Moreover, an object of the present invention is to provide a superhydrophobic film including a coated film excellent in "superhydrophobicity" and "durability of hydrophobicity".

Solution to Problem

Means for solving the above problems are as follows. That is,
<1> A coating composition including:
the following five components 1) to 5):
1) a fluorine-containing multifunctional (meth)acrylate;
2) a binder component that is free of fluorine and reacts with the 1) component;
3) metal oxide nanoparticles each including an organic group on a surface thereof;
4) a solvent having a total ($\delta P+\delta H$) of 8 $MPa^{1/2}$ or more, the total ($\delta P+\delta H$) being a total of a polar term $\delta P$ and a hydrogen bond term $\delta H$ in Hansen solubility parameters; and
5) a reaction initiator.
<2> The coating composition according to <1>, wherein the total ($\delta P+\delta H$) is 10 $MPa^{1/2}$ or more.
<3> The coating composition according to <1>, wherein the total ($\delta P+\delta H$) is 21 $MPa^{1/2}$ or less.
<4> The coating composition according to any one of <1> to <3>, wherein the organic group existing on the surface of each of the metal oxide nanoparticles is at least one group selected from the group consisting of the following a) to c):
a) a [(meth)acryloyloxyalkyl]silyl group;
b) a dimethylsilyl group; and
c) a trimethylsilyl group.
<5> The coating composition according to <4>, wherein the organic group on the surface of each of the metal oxide nanoparticles is the [(meth)acryloyloxyalkyl]silyl group.
<6> The coating composition according to any one of <1> to <5>, wherein the metal oxide nanoparticles are silica.
<7> The coating composition according to any one of <1> to <6>, wherein the binder component of the 2) is a (meth)acrylic monomer.
<8> The coating composition according to <7>, wherein the binder component of the 2) is a multifunctional (meth) acrylic monomer.
<9> The coating composition according to any one of <1> to <8>, wherein the fluorine-containing multifunctional (meth)acrylate of the 1) has a structure of perfluoropolyether.
<10> A superhydrophobic film including:
a coated film, which is formed of the coating composition according to any one of <1> to <9>,
wherein a contact angle of the superhydrophobic film with respect to water is 150° or more.
<11> The superhydrophobic film according to <10>, wherein a surface roughness Ra of the superhydrophobic film is 30 nm or more.
<12> The superhydrophobic film according to <11>, wherein the surface roughness Ra of the superhydrophobic film is 40 nm or more.
<13> The superhydrophobic film according to any one of <10> to <12>, wherein a visible light transmittance of the superhydrophobic film is 80% or more.

Advantageous Effects of Invention

According to the present invention, it is possible to solve the conventionally existing problems, achieve the object, and provide a coating composition that can form a coated film excellent in "superhydrophobicity" and "durability of hydrophobicity".

Moreover, the present invention can provide a superhydrophobic film including a coated film excellent in "superhydrophobicity" and "durability of hydrophobicity".

DESCRIPTION OF EMBODIMENTS (Coating Composition)

A coating composition of the present invention includes the following five components 1) to 5): and includes other components if necessary:
 1) a fluorine-containing multifunctional (meth)acrylate;
 2) a binder component that is free of fluorine and reacts with the 1) component;
 3) metal oxide nanoparticles each including an organic group on a surface thereof;
 4) a solvent having a total ($\delta P+\delta H$) of 8 $MPa^{1/2}$ or more, the total ($\delta P+\delta H$) being a total of a polar term $\delta P$ and a hydrogen bond term $\delta H$ in Hansen solubility parameters; and
 5) a reaction initiator.

The coating composition satisfying the above requirements of the present invention can form a coated film excellent in "superhydrophobicity" and "durability of hydrophobicity". In addition, the coating composition of the present invention can form a coated film having no coating unevenness and being excellent in transmittance.

The hydrophobic coating described in the PTL 1 is coated on a substrate so that a thickness of the resultant coated film is 25 μm according to its Examples. Then, the coated film is dried at 37° C. for 15 minutes and is washed with water. Then, the coated film is further dried at 150° C. for 30 minutes to form a hydrophobic coated film. The present inventors, however, have concluded that a film including the coating composition in PTL 1 does not have sufficient "durability of hydrophobicity" because of the looseness of the formed film. In particular, it is not suitable for formation of the film having a film thickness of 400 nm or less, which is the target thickness in the present invention. In addition, it is concluded that a constituent component of the coating composition in PTL 1 makes the resultant film clouded. Therefore, it is not possible to secure the desired transmittance of the film described in the present invention.

As a result of performing various experiments, the present inventors have found that a superhydrophobic film excellent in both "superhydrophobicity" and "durability of hydrophobicity" can be obtained by use of a method including using a monomer-containing coating composition to form a coated film containing monomers and applying heat and energy rays such as ultraviolet rays to form a hydrophobic film; and by use of the specific monomers and other components to be incorporated into the coating composition.

In the present invention, it is important that 1) the fluorine-containing (meth)acrylate of the 1) having an effect on decreasing the surface free energy is a multifunctional (meth)acrylate. When the (meth)acrylate is a monofunctional (meth)acrylate, sufficient hydrophobicity cannot be obtained. The reason for this is possibly considered as described below. That is, the monofunctional (meth)acrylate forms a coated film non-crosslinked and therefore it is difficult to fix fluorine orientated on the surface.

In the present invention, in order to secure sufficient adhesiveness force to a substrate, it is important to incorporate the 2), a binder component that reacts with the (meth)acrylate of the 1).

In the present invention, in order to adjust surface roughness of the coated film and further achieve hydrophobicity, it is important that the metal oxide nanoparticles of the 3) include metal oxide nanoparticles each containing an organic group on a surface thereof to improve dispersibility of the metal oxide nanoparticles considering affinity with the fluorine-containing multifunctional (meth)acrylate of the 1) and the binder component of the 2).

Moreover, in the present invention, in order to lower viscosity of the coating liquid upon coating, the 1) component to the 3) component are dissolved in a solvent. Here, it is important to use a solvent having a total ($\delta P+\delta H$) of 8 $MPa^{1/2}$ or more, where the total ($\delta P+\delta H$) is a total of a polar term $\delta P$ and a hydrogen bond term $\delta H$ in Hansen solubility parameters. As a result, it is believed that the solvent has excellent affinity with the 1) component to the 3) component and allows these components to be favorably dispersed, which makes it possible to obtain a film excellent in hydrophobicity.

When the coating composition satisfying all the aforementioned requirements is used to form a hydrophobic film, it is possible to obtain a hydrophobic film, which is a reinforced hydrophobic film having three-dimensional cross-linkages obtained by fixing fluorine on a surface thereof, and has a favorable degree of dispersion of the metal oxide nanoparticles as well as a favorable degree of surface roughness of the film. The hydrophobic film leads to have the following properties: excellence in "superhydrophobicity" and "durability of hydrophobicity"; absence of coating unevenness; and favorable transmittance.

<Fluorine-Containing Multifunctional (Meth)Acrylate>

In the present invention, "(meth)acrylic" is used as an abbreviation of acryl and/or methacryl, "(meth)acrylate" is used as an abbreviation of acrylate and/or methacrylate, and "(meth)acryloyl" is used as an abbreviation of acryloyl and/or methacryloyl.

The fluorine-containing multifunctional (meth)acrylate is not particularly limited and may be appropriately selected depending on the intended purpose but is preferably a multifunctional (meth)acrylate including a structure of perfluoropolyether.

A molecular weight of the fluorine-containing multifunctional (meth)acrylate is not particularly limited but is preferably about 1,000 to about 5,000.

As an amount of the fluorine-containing multifunctional (meth)acrylate, a ratio of the 1) component to a total of the 1) component to the 3) component (i.e., the 1) component/(the 1) component+the 2) component+the 3) component) is preferably 10% by mass or more but 35% by mass or less, more preferably 15% by mass or more but 35% by mass or less.

Here, in the present invention, the 1) component means 1) a fluorine-containing multifunctional (meth)acrylate, the 2) component means 2) a binder component that is free of fluorine and reacts with the 1) component, and the 3) component means 3) metal oxide nanoparticles each including an organic group on a surface thereof.

<Binder Component that is Free of Fluorine and Reacts with 1) Component>

The binder component that is free of fluorine and reacts with the 1) component described in the 2) can be monomer, oligomer, or polymer without any limitation and can be appropriately selected depending on the intended purpose so long as a terminal thereof includes a (meth)acrylic group because the binder component imparts, to the coating composition, sufficient adhesive force to a substrate.

Among them, a (meth)acrylic monomer is preferable. In addition, when the (meth)acrylic monomer is a multifunctional (meth)acrylic monomer, it is more preferable because aggregation force in the coated film can be secured.

As an amount of the (meth)acrylic monomer, a ratio of the 2) component to the total of the 1) component to the 3) component (i.e., the 2) component/(the 1) component+the 2) component+the 3) component) may be 20% by mass or more but 70% by mass or less, more preferably 25% by mass or more but 55% by mass or less.

<Metal Oxide Nanoparticles Including Organic Group on Surface Thereof>

The organic group existing on the surface of each of the metal oxide nanoparticles may be at least one group described in the following a) to c) in terms of affinity with the 1) component or the 2) component:

a) a [(meth)acryloyloxyalkyl]silyl group;
b) a dimethylsilyl group; and
c) a trimethylsilyl group.

Among them, the organic group is more preferably the [(meth)acryloyloxyalkyl]silyl group. This is because the [(meth)acryloyloxyalkyl]silyl group is chemically bound during polymerization reaction with the 1) component or the 2) component, so that more excellent affinity can be obtained.

The metal oxide nanoparticles are not particularly limited and may be appropriately selected depending on the intended purpose, but are more preferably silica.

The metal oxide nanoparticles may have an average particle diameter of 100 nm or less. Nanoparticles of an average particle diameter of 5 nm or more but 50 nm or less can suitably be used.

As an amount of the metal oxide nanoparticles each including an organic group on a surface thereof, the 3) component/(the 1) component+the 2) component+the 3) component) may be 20% by mass or more but 70% by mass or less, more preferably 25% by mass or more but 50% by mass or less.

<Solvent>

As the solvent, which is used to lower viscosity of the coating liquid upon coating and dissolves the 1) component to the 3) component, a solvent having a total ($\delta P+\delta H$) of 8 $MPa^{1/2}$ or more is used, where the total ($\delta P+\delta H$) is a total of a polar term $\delta P$ and a hydrogen bond term $\delta H$ in Hansen solubility parameters.

Moreover, the total ($\delta P+\delta H$) is preferably 8.5 $MPa^{1/2}$ or more, more preferably 10 $MPa^{1/2}$ or more. In addition, the total ($\delta P+\delta H$) may be 25 $MPa^{1/2}$ or less, more preferably 21 $MPa^{1/2}$ or less. This is because the aforementioned ranges make it possible to achieve more favorable dispersibility, resulting in a coated film that is more excellent in hydrophobicity.

Here, the Hansen solubility parameters are parameters illustrated in a three-dimensionally space obtained by dividing the solubility parameter introduced by Hildebrand into 3 components: i.e., dispersion term ($\delta D$); polar term ($\delta P$); and hydrogen bond term ($\delta H$).

The definition and the calculation method of the Hansen solubility parameters are described in the following literature:

Charles M. Hansen, "Hansen Solubility Parameters: A Users Handbook", CRC Press, 2007.

When the solvent is a mixture solvent in combination of two or more solvents, a mixing ratio (volume ratio) of the solvent mixture is used to determine average Hansen solubility parameters.

The usable solvent is not particularly limited and may be appropriately selected depending on the intended purpose so long as it satisfies the aforementioned requirements. Examples of the solvent include &acetone alcohol (DAA), propylene glycol monomethylether acetate (PGMEA), methyl ethyl ketone (MEK), butyl acetate (BA), isopropyl alcohol (IPA), diisobutyl ketone (DIBK), and hexyl acetate (HA).

<Reaction Initiator>

The reaction initiator is not particularly limited and may be appropriately selected depending on the intended purpose so long as it is a polymerization initiator allowing the fluorine-containing multifunctional (meth)acrylate of the 1) or the binder component (particularly, a (meth)acrylic monomer) of the 2) to generate polymerization reaction through heat or light.

For example, substances that generate radical polymerization reaction, which is generated by radicals through irradiation of energy rays, can generally be used.

<Other Components>

As the other components, for example, a filler, an antioxidant, a viscosity modifier, and a leveling agent may be incorporated.

A fluorine-containing monofunctional (meth)acrylate or metal oxide nanoparticles each containing no organic group on a surface thereof may be incorporated so long as an amount thereof is such a small amount that the effect of the present invention is not prevented.

(Superhydrophobic Film)

A superhydrophobic film of the present invention can be formed in the following manner: i.e., the coating composition of the present invention is coated on a surface of a substrate to form a coated film; the solvent is removed; and polymerization reaction is generated through heat and/or light irradiation.

An average thickness of the superhydrophobic film may be adjusted so that an average thickness of the resultant coated film after the drying step, from which the solvent has been removed, is 74 nm to 200 nm.

<Substrate>

A substrate intended to form the superhydrophobic film is not particularly limited and may be appropriately selected depending on the intended purpose so long as the substrate is a substrate required to impart hydrophobicity. Examples of the surface of the substrate include metals, resins, glass, ceramics, and composite materials thereof.

<Properties of Film>

A superhydrophobic film of the present invention can have a contact angle with respect to water of 150° or more.

The contact angle with respect to water of 150° or more makes it possible to achieve excellent hydrophobicity and self-cleaning ability, resulting in a superhydrophobic film excellent for practical use.

An arithmetic average roughness Ra of the superhydrophobic film of the present invention may be 30 nm or more, more preferably 40 nm or more. Larger Ra makes it possible to improve hydrophobicity.

The superhydrophobic film of the present invention has visible light transmittance of 80% or more.

As described above, the superhydrophobic film has high transmittance, it can further exhibit the effects when used for, for example, window glass, mirrors, and liquid crystal screens.

<Application Fields>

The superhydrophobic film serves as a film having a superhydrophobicity and can be used in various fields (e.g., window glass, automobile bodies, panels of solar cells, traffic signals, and playground equipment in the park).

EXAMPLES

Hereinafter, the present invention will next be described by way of Examples. However, the present invention should not be construed as being limited to these Examples.

Example 1

Fluorine-containing multifunctional acrylate (product name: KY1203, available from Shin-Etsu Chemical Co., Ltd., solid content: 20% by mass) (15 parts by mass), a multifunctional acrylic monomer (product name: PETIA, available from DAICEL-ALLNEX LTD.) (55 parts by mass), fumed silica that had been surface-treated with a (methacryloyloxyalkyl)silyl group (average particle diameter 12 nm, product name: AEROSIL R711, available from NIPPON AEROSIL CO., LTD.) (30 parts by mass), and a polymerization initiator (product name: DAROCUR 1173, available from BASF Japan Ltd.) (3 parts by mass) were added to a solvent (DAA) so that a solid content would be 5% by mass to prepare a solution. The solution was dispersed through ultrasonic wave for 30 minutes.

In Example 1, silica particles presented in the following Table 1 were used. In addition, formulation of the coating composition of Example 1 is presented in Table 2 below. Here, the column of KY1203 presents an amount of the fluorine-containing multifunctional acrylate incorporated in the KY1203.

Moreover, the KY1203 is a multifunctional acrylate having a structure of perfluoropolyether.

Next, the solution was coated on a PET (polyethylene terephthalate) film (LUMIRROR U48, available from Toray Industries, Inc.) using Select-Roller (OSP-03, available from OSG SYSTEM PRODUCTS CO., LTD) so that a wet film thickness was 3 μm (coating step).

Then, the coated film was heated in an oven at 80° C. for 1 minute to evaporate the solvent (drying step). After the drying, an average thickness of the coated film was about 150 nm.

Furthermore, the coated film obtained after the drying step was irradiated with ultraviolet rays at 2,000 mJ/cm$^2$ using a metal halide lamp of a conveyer-type UV irradiation device (available from EYE GRAPHICS CO., LTD.) in a nitrogen atmosphere to obtain a superhydrophobic film.

<Evaluation of Superhydrophobic Film>

The prepared superhydrophobic film was measured and evaluated as described below. Note that, the coated film obtained after the coating step and the coated film obtained after the drying step, each of these coated films being in the middle stage of the film formation, were evaluated for the coating unevenness.

<<Contact Angle>>

A contact angle testing apparatus (DM-501) (available from Kyowa Interface Science Co., Ltd) was used to measure a contact angle with respect to pure water (2 μL) on the film under the condition of 23° C.

<<Contact Angle after Immersion>>

After immersed in water, the superhydrophobic film was measured for the contact angle to evaluate durability of hydrophobicity.

After the contact angle was measured in the aforementioned method, the film was immersed in pure water (23° C.) for 30 minutes and was dried. Then, after dried, the film was measured for the contact angle with respect to water in the aforementioned method again.

If the value of the contact angle before the immersion was bad, the value of the contact angle after the immersion would be expected to be as bad as or worse than the value of the contact angle before the immersion. Thus, when the value of the contact angle before the immersion was such a level that did not deserve to be measured, the contact angle after the immersion was not measured and is presented as "–".

<<Ra (nm)>>

A scanning probe microscope (available from Hitachi High-Tech Science Corporation, device: SPA400 (unit), NANONAVI II (probe station)) was used to obtain an arithmetic average roughness (Ra) under the following conditions: Dynamic Force Microscope mode; measurement area: 5 μm×5 μm, the number of measurement points: 256×256.

<<Transmittance>>

A spectrophotometer (V-560, available from JASCO Corporation) was used to measure the film including a substrate for transmittance of rays to obtain an average transmittance in the range of 400 nm to 800 nm.

<<Coating Unevenness (Visual Observation)>>

The coated film obtained after the coating step-drying step was visually observed to confirm whether the coating unevenness was present or not.

Evaluation Criteria

A: The coating unevenness is not observed.

B: The coating unevenness is slightly observed upon coating but is not observed after the drying step.

C: The coating unevenness is observed even after the drying step.

Regarding the superhydrophobic films, results obtained based on the aforementioned evaluation methods are presented in Table 2 below.

Examples 2 to 8

A superhydrophobic film was prepared in the same manner as in Example 1 except that the kind of the solvent was changed as presented in Tables 2 and 3. The superhydrophobic film was evaluated in the same manner as in Example 1. Results are presented in Tables 2 and 3.

In Tables 2 and 3, for example, IPA50/PGMEA50 used in Example 5 means a mixture solvent obtained by mixing IPA with PGMEA at a volume ratio of 50:50 (=1:1).

Examples 9 and 10

A superhydrophobic film was prepared in the same manner as in Example 1 recited in Example 4 by using each coating composition having the same formulation as in Example 4 except that the amount of the fluorine-containing multifunctional acrylate (KY1203) was changed as presented in Table 3 to have the corresponding formulation as presented in Table 3. The superhydrophobic film was evaluated in the same manner as in Example 1. Results are presented in Table 3.

Examples 11 and 12

A superhydrophobic film was prepared in the same manner as in Example 1 recited in Example 4 by using each coating composition having the same formulation as in Example 4 except that the amount of the fumed silica that had been surface-treated with the (methacryloyloxyalkyl) silyl group (AEROSIL R711) was changed as presented in Table 4 to have the corresponding formulation as presented in Table 4. The superhydrophobic film was evaluated in the same manner as in Example 1. Results are presented in Table 4.

Examples 13 and 14

A superhydrophobic film was prepared in the same manner as in Example 1 recited in Example 4 by using each coating composition having the same formulation as in Example 4 except that the amount of the fluorine-containing multifunctional acrylate (KY1203) was changed to another fluorine-containing multifunctional acrylate presented in Table 4 to have the corresponding formulation as presented in Table 4. The superhydrophobic film was evaluated in the same manner as in Example 1. Results are presented in Table 4.

Here, the fluorine-containing multifunctional acrylate used in Example 13 is product name: DAC-HP (available from DAIKIN INDUSTRIES, LTD, solid content: 20% by mass). Moreover, the fluorine-containing multifunctional acrylate used in Example 14 is product name: RS-75 (available from DIC Corporation, solid content: 40% by mass).

Example 15

A superhydrophobic film was prepared in the same manner as in Example 1 recited in Example 4 by using a coating composition having the same formulation as in Example 4 except that the multifunctional acrylic monomer (PETIA) was changed to another multifunctional acrylic monomer presented in Table 4 to have the corresponding formulation as presented in Table 4. The superhydrophobic film was evaluated in the same manner as in Example 1. Results are presented in Table 4.

Here, the multifunctional acrylic monomer used in Example 15 is product name: HDDA (available from DAICEL-ALLNEX LTD.).

Examples 16 and 17

A superhydrophobic film was prepared in the same manner as in Example 1 recited in Example 4 by using each coating composition having the same formulation as in Example 4 except that the fumed silica that had been surface-treated with the (methacryloyloxyalkyl)silyl group (AEROSIL R711) was changed to another fumed silica as presented in Table 5 to have the corresponding formulation as presented in Table 5. The superhydrophobic film was evaluated in the same manner as in Example 1. Results are presented in Table 5.

Here, the fumed silica used in Example 16 is product name: AEROSIL R976S (available from NIPPON AEROSIL CO., LTD.). Moreover, the fumed silica used in Example 17 is product name: AEROSIL RX200 (available from NIPPON AEROSIL CO., LTD.). These silica particles are each described in detail as presented in Table 1.

Example 18

A superhydrophobic film was prepared in the same manner as in Example 1 recited in Example 4 by using a coating composition having the same formulation as in Example 4 except that the multifunctional acrylic monomer (PETIA) was changed to another monofunctional acrylic monomer presented in Table 5 to have the corresponding formulation as presented in Table 5. The superhydrophobic film was evaluated in the same manner as in Example 1. Results are presented in Table 5.

Here, the monofunctional acrylic monomer used in Example 18 is product name: CHDMMA (available from Nippon Kasei Chemical Company Limited).

Examples 19 and 20

A superhydrophobic film was prepared in the same manner as in Example 1 except that the kind of the solvent was changed as presented in Table 5. The superhydrophobic film was evaluated in the same manner as in Example 1. Results are presented in Table 5.

Comparative Example 1

A superhydrophobic film was prepared in the same manner as in Example 1 except that the kind of the solvent was changed as presented in Table 6. The superhydrophobic film was evaluated in the same manner as in Example 1. Results are presented in Table 6.

Comparative Examples 2 and 3

A superhydrophobic film was prepared in the same manner as in Example 1 recited in Example 4 by using each coating composition having the same formulation as in Example 4 except that the fluorine-containing multifunctional acrylate (KY1203) was changed to the fluorine-containing monofunctional acrylate presented in Table 6 to have the corresponding formulation as presented in Table 6. The superhydrophobic film was evaluated in the same manner as in Example 1. Results are presented in Table 6.

The fluorine-containing monofunctional acrylate used in Comparative Examples 2 and 3 is product name: VISCOAT 13F (available from Osaka Organic Chemical Industry Ltd.).

Comparative Example 4

A superhydrophobic film was prepared in the same manner as in Example 1 recited in Example 4 by using a coating composition having the same formulation as in Example 4 except that the fluorine-containing multifunctional acrylate (KY1203) was not included to have the corresponding formulation as presented in Table 6. The superhydrophobic film was evaluated in the same manner as in Example 1. Results are presented in Table 6.

Comparative Example 5

A superhydrophobic film was prepared in the same manner as in Example 1 recited in Example 4 by using a coating composition having the same formulation as in Example 4 except that the fumed silica that had been surface-treated with the (methacryloyloxyalkyl)silyl group (AEROSIL R711) was changed to the fumed silica that had not been surface-treated as presented in Table 6 to have the corresponding formulation as presented in Table 6. The superhydrophobic film was evaluated in the same manner as in Example 1. Results are presented in Table 6.

Here, the fumed silica used in Comparative Example 5 is product name: AEROSIL 300 (available from NIPPON AEROSIL CO., LTD.). The detail of the aforementioned silica particles is presented in Table 1.

Comparative Example 6

A superhydrophobic film was prepared in the same manner as in Example 1 recited in Example 4 by using a coating composition having the same formulation as in Example 4 except that the fumed silica (AEROSIL R711) was not included to have the corresponding formulation as presented in Table 7. The superhydrophobic film was evaluated in the same manner as in Example 1. Results are presented in Table 7.

Comparative Example 7

A superhydrophobic film was prepared in the same manner as in Example 1 recited in Example 4 except that the fluorine-containing multifunctional acrylate (KY1203) was changed to the fluorine-containing monofunctional acrylate presented in Table 7 and the multifunctional acrylic monomer (PETIA) was changed to another monofunctional acrylic monomer presented in Table 7 to have the corresponding formulation as presented in Table 7. The superhydrophobic film was evaluated in the same manner as in Example 1. Results are presented in Table 7.

Comparative Example 8

A superhydrophobic film was prepared in the same manner as in Example 1 recited in Example 4 by using a coating composition having the same formulation as in Example 4 except that the fluorine-containing multifunctional acrylate (KY1203) was changed to the fluorine-containing monofunctional acrylate presented in Table 7 and the fumed silica that had been surface-treated with the (methacryloyloxyalkynsilyl group (AEROSIL R711) was changed to the fumed silica that had not been surface-treated presented in Table 7 to have the corresponding formulation as presented in Table 7. The superhydrophobic film was evaluated in the same manner as in Example 1. Results are presented in Table 7.

TABLE 1

| Particles | Particle diameter | Particle surface modification |
|---|---|---|
| AEROSIL R711 | 12 nm | (Methacryloyloxyalkyl)silyl group |
| AEROSIL R976S | 7 nm | Dimethylsilyl group |
| AEROSIL RX200 | 12 nm | Trimethylsilyl group |
| AEROSIL 300 | 7 nm | Untreated |

TABLE 2

| Materials | Example 1 | Example 2 | Example 3 | Example 4 | Example 5 |
|---|---|---|---|---|---|
| Solvent | DAA | PGMEA | MEK | BA | IPA50/PGMEA50 |
| $\delta P + \delta H$ (MPa$^{1/2}$) | 19 | 15.4 | 14.1 | 10 | 18.95 |
| AEROSIL R711 | 30 | 30 | 30 | 30 | 30 |
| AEROSIL R976S | | | | | |
| AEROSIL RX200 | | | | | |
| AEROSIL 300 | | | | | |
| KY1203 (fluorine + multifunctional) | 15 | 15 | 15 | 15 | 15 |
| DAC-HP (fluorine + multifunctional) | | | | | |
| RS-75 (fluorine + multifunctional) | | | | | |
| VISCOAT 13F (fluorine + monofunctional) | | | | | |
| PETIA (multifunctional + Ac) | 55 | 55 | 55 | 55 | 55 |
| HDDA (multifunctional + Ac) | | | | | |
| CHDMMA (monofunctional + Ac) | | | | | |
| DAROCUR 1173 (polymerization initiator) | 3 | 3 | 3 | 3 | 3 |
| Contact angle (water) (°) | 151 | 153 | 151 | 158 | 154 |
| Contact angle (water) after immersion (°) | 150 | 151 | 150 | 156 | 153 |
| Ra (nm) | 46 nm | 46 nm | 41 nm | 48 nm | 40 nm |
| Transmittance (%) | 84.4% | 86.9% | 88.0% | 83.7% | 88.2% |
| Coating unevenness (visual observation) | A | A | A | A | A |

TABLE 3

| Materials | Example 6 | Example 7 | Example 8 | Example 9 | Example 10 |
|---|---|---|---|---|---|
| Solvent | IPA50/BA50 | IPA50/DIBK50 | PGMEA50/DIBK50 | BA | BA |
| $\delta P + \delta H$ (MPa$^{1/2}$) | 16.25 | 15.15 | 11.6 | 10 | 10 |
| AEROSIL R711 | 30 | 30 | 30 | 30 | 30 |
| AEROSIL R976S | | | | | |
| AEROSIL RX200 | | | | | |
| AEROSIL 300 | | | | | |

TABLE 3-continued

| Materials | Example 6 | Example 7 | Example 8 | Example 9 | Example 10 |
|---|---|---|---|---|---|
| KY1203 (fluorine + multifunctional) | 15 | 15 | 15 | 10 | 35 |
| DAC-HP (fluorine + multifunctional) | | | | | |
| RS-75 (fluorine + multifunctional) | | | | | |
| VISCOAT 13F (fluorine + monofunctional) | | | | | |
| PETIA (multifunctional + Ac) | 55 | 55 | 55 | 60 | 35 |
| HDDA (multifunctional + Ac) | | | | | |
| CHDMMA (monofunctional + Ac) | | | | | |
| DAROCUR 1173 (polymerization initiator) | 3 | 3 | 3 | 3 | 3 |
| Contact angle (water) (°) | 156 | 156 | 158 | 157 | 159 |
| Contact angle (water) after immersion (°) | 155 | 154 | 167 | 155 | 157 |
| Ra (nm) | 49 nm | 56 nm | 58 nm | 48 nm | 48 nm |
| Transmittance (%) | 85.6% | 84.0% | 86.4% | 83.6% | 84.5% |
| Coating unevenness (visual observation) | A | A | A | A | A |

TABLE 4

| Materials | Example 11 | Example 12 | Example 13 | Example 14 | Example 15 |
|---|---|---|---|---|---|
| Solvent | BA | BA | BA | BA | BA |
| δP + δH (MPa$^{1/2}$) | 10 | 10 | 10 | 10 | 10 |
| AEROSIL R711 | 25 | 50 | 30 | 30 | 30 |
| AEROSIL R976S | | | | | |
| AEROSIL RX200 | | | | | |
| AEROSIL 300 | | | | | |
| KY1203 (fluorine + multifunctional) | 15 | 15 | | | 15 |
| DAC-HP (fluorine + multifunctional) | | | 35 | | |
| RS-75 (fluorine + multifunctional) | | | | 35 | |
| VISCOAT 13F (fluorine + monofunctional) | | | | | |
| PETIA (multifunctional + Ac) | 60 | 35 | 35 | 35 | |
| HDDA (multifunctional + Ac) | | | | | 55 |
| CHDMMA (monofunctional + Ac) | | | | | |
| DAROCUR 1173 (polymerization initiator) | 3 | 3 | 3 | 3 | 3 |
| Contact angle (water) (°) | 152 | 157 | 150 | 151 | 159 |
| Contact angle (water) after immersion (°) | 151 | 156 | 150 | 150 | 158 |
| Ra (nm) | 44 nm | 49 nm | 48 nm | 48 nm | 46 nm |
| Transmittance (%) | 83.0% | 86.8% | 84.0% | 84.0% | 89.0% |
| Coating unevenness (visual observation) | A | A | A | A | A |

TABLE 5

| Materials | Example 16 | Example 17 | Example 18 | Example 19 | Example 20 |
|---|---|---|---|---|---|
| Solvent | BA | BA | BA | IPA | HA |
| δP + δH (MPa$^{1/2}$) | 10 | 10 | 10 | 22.5 | 8.8 |
| AEROSIL R711 | | | 30 | 30 | 30 |
| AEROSIL R976S | 30 | | | | |
| AEROSIL RX200 | | 30 | | | |
| AEROSIL 300 | | | | | |

TABLE 5-continued

| Materials | Example 16 | Example 17 | Example 18 | Example 19 | Example 20 |
|---|---|---|---|---|---|
| KY1203 (fluorine + multifunctional) | 15 | 15 | 15 | 15 | 15 |
| DAC-HP (fluorine + multifunctional) | | | | | |
| RS-75 (fluorine + multifunctional) | | | | | |
| VISCOAT 13F (fluorine + monofunctional) | | | | | |
| PETIA (multifunctional + Ac) | 55 | 55 | | 55 | 55 |
| HDDA (multifunctional + Ac) | | | | | |
| CHDMMA (monofunctional + Ac) | | | 55 | | |
| DAROCUR 1173 (polymerization initiator) | 3 | 3 | 3 | 3 | 3 |
| Contact angle (water) (°) | 157 | 160 | 159 | 146 | 159 |
| Contact angle (water) after immersion (°) | 150 | 151 | 154° | 144 | 156 |
| Ra (nm) | 37 nm | 44 nm | 46 nm | 48 nm | 56 nm |
| Transmittance (%) | 88.9% | 88.1% | 89.4% | 84.4% | 75.0% |
| Coating unevenness (visual observation) | A | A | A | B | A |

TABLE 6

| Materials | Comparative Example 1 | Comparative Example 2 | Comparative Example 3 | Comparative Example 4 | Comparative Example 5 |
|---|---|---|---|---|---|
| Solvent | DIBK | BA | BA | BA | BA |
| δP + δH (MPa$^{1/2}$) | 7.8 | 10 | 10 | 10 | 10 |
| AEROSIL R711 | 30 | 30 | 30 | 30 | |
| AEROSIL R976S | | | | | |
| AEROSIL RX200 | | | | | |
| AEROSIL 300 | | | | | 30 |
| KY1203 (fluorine + multifunctional) | 15 | | | | 15 |
| DAC-HP (fluorine + multifunctional) | | | | | |
| RS-75 (fluorine + multifunctional) | | | | | |
| VISCOAT 13F (fluorine + monofunctional) | | 15 | 35 | | |
| PETIA (multifunctional + Ac) | 55 | 55 | 35 | 70 | 55 |
| HDDA (multifunctional + Ac) | | | | | |
| CHDMMA (monofunctional + Ac) | | | | | |
| DAROCUR 1173 (polymerization initiator) | 3 | 3 | 3 | 3 | 3 |
| Contact angle (water) (°) | 117 | 54 | 56 | 70 | 127 |
| Contact angle (water) after immersion (°) | — | — | — | — | — |
| Ra (nm) | 34 nm | 34 nm | 38 nm | 49 nm | 75 nm |
| Transmittance (%) | 73.0% | 89.1% | 89.0% | 84.4% | 71.4% |
| Coating unevenness (visual observation) | B | C | C | A | C |

TABLE 7

| Materials | Comparative Example 6 | Comparative Example 7 | Comparative Example 8 |
|---|---|---|---|
| Solvent | BA | BA | BA |
| δP + δH (MPa$^{1/2}$) | 10 | 10 | 10 |
| AEROSIL R711 | | | |
| AEROSIL R976S | | 30 | |
| AEROSIL RX200 | | | |
| AEROSIL 300 | | | 30 |
| KY1203 (fluorine + multifunctional) | 15 | | |
| DAC-HP (fluorine + multifunctional) | | | |
| RS-75 (fluorine + multifunctional) | | | |

TABLE 7-continued

| Materials | Comparative Example 6 | Comparative Example 7 | Comparative Example 8 |
|---|---|---|---|
| VISCOAT 13F (fluorine + monofunctional) | | 15 | 15 |
| PETIA (multifunctional + Ac) | 85 | | 55 |
| HDDA (multifunctional + Ac) | | | |
| CHDMMA (monofunctional + Ac) | | 55 | |
| DAROCUR 1173 (polymerization initiator) | 3 | 3 | 3 |
| Contact angle (water) (°) | 113 | 57 | 52 |
| Contact angle (water) after immersion (°) | — | — | — |
| Ra (nm) | 1 nm | 31 nm | 30 nm |
| Transmittance (%) | 90.5% | 88.0% | 72.5% |
| Coating unevenness (visual observation) | A | C | C |

From the results of the Examples, it can be confirmed that the superhydrophobic film of the present invention is excellent in "superhydrophobicity" and "durability of hydrophobicity" and exhibits favorable effects regarding coating unevenness and transmittance.

In Comparative Examples 2, 3, 7, and 8, the fluorine-containing monofunctional acrylate was used instead of the fluorine-containing multifunctional acrylate. However, use of the fluorine-containing monofunctional acrylate causes coating unevenness due to repellence. In addition, the values of the contact angle become poor. It is believed that the fluorine-containing monofunctional acrylate makes it difficult to fix fluorine on a surface. On the other hand, an acrylic monomer (i.e., binder component), which reacts with the fluorine-containing multifunctional acrylate, exhibits desired effects even when the acrylic monomer is the multifunctional acrylic monomer or the monofunctional acrylic monomer (Example 18). Therefore, from the results of Example 4, Example 18, Comparative Example 2, and Comparative Example 7, it is found to be necessary that the fluorine-containing (meth)acrylate is not the monofunctional (meth)acrylate but is the multifunctional (meth)acrylate.

Moreover, in Comparative Examples 5 and 8, use of the non-treated silica that has not been surface-treated results in poor dispersibility and poor value of the contact angle. In addition, use of the non-treated silica causes coating unevenness due to aggregation and results in poor transmittance. Therefore, from the results of Example 4, Comparative Example 2, Comparative Example 5, and Comparative Example 8, it is found that the fluorine-containing (meth)acrylate is necessarily the multifunctional (meth)acrylate and the surfaces of the metal oxide nanoparticles to be incorporated necessarily include organic groups and undergo the surface-treatment.

The invention claimed is:

1. A coating composition comprising:
    the following five components 1 to 5:
    1) a fluorine-containing multifunctional (meth)acrylate;
    2) a binder component that is free of fluorine and reacts with component 1;
    3) metal oxide nanoparticles each including an organic group on a surface thereof;
    4) a solvent having a total (δP+δH) of 8 MPa$^{1/2}$ or more, the total (δP+δH) being a total of a polar term δP and a hydrogen bond term δH in Hansen solubility parameters; and
    5) a reaction initiator;
    wherein a mass ratio of component 1 to the total of components 1, 2 and 3 is between 10% by mass and 35% by mass;
    wherein a mass ratio of component 2 to the total of components 1, 2, and 3 is between 25% by mass and 70% by mass; and
    wherein a mass ratio of component 3 to the total of components 1, 2, and 3 is between 20% by mass and 50% by mass.

2. The coating composition according to claim 1, wherein the total (δP+δH) is 10 MPa$^{1/2}$ or more.

3. The coating composition according to claim 1, wherein the total (δP+δH) is 21 MPa$^{1/2}$ or less.

4. The coating composition according to claim 1, wherein the organic group existing on the surface of each of the metal oxide nanoparticles is at least one group selected from the group consisting of the following a) to c):
    a) a [(meth)acryloyloxyalkyl]silyl group;
    b) a dimethylsilyl group; and
    c) a trimethylsilyl group.

5. The coating composition according to claim 4, wherein the organic group on the surface of each of the metal oxide nanoparticles is the [(meth)acryloyloxyalkyl]silyl group.

6. The coating composition according to claim 1, wherein the metal oxide nanoparticles are silica.

7. The coating composition according to claim 1, wherein the binder component of the 2) is a (meth)acrylic monomer.

8. The coating composition according to claim 7, wherein the binder component of the 2) is a multifunctional (meth)acrylic monomer.

9. The coating composition according to claim 1, wherein the fluorine-containing multifunctional (meth)acrylate of the 1) has a structure of perfluoropolyether.

10. A superhydrophobic film comprising:
    a coated film, which is formed of the coating composition according to claim 1,
    wherein a contact angle of the superhydrophobic film with respect to water is 150° or more.

11. A superhydrophobic film comprising:
    a coated film of a coating composition including the following five components 1 to 5:
    1) a fluorine-containing multifunctional (meth)acrylate;
    2) a binder component that is free of fluorine and reacts with component 1;
    3) metal oxide nanoparticles each including an organic group on a surface thereof;
    4) a solvent having a total (δP+δH) of 8 MPa$^{1/2}$ or more, the total (δP+δH) being a total of a polar term δP and a hydrogen bond term δH in Hansen solubility parameters; and
    5) a reaction initiator,
    wherein a contact angle of the superhydrophobic film with respect to water is 150° or more; and
    wherein a mass ratio of component 2 to the total of components 1, 2, and 3 is between 25% by mass and 70% by mass; and
    wherein a mass ratio of component 3 to the total of components 1, 2, and 3 is between 20% by mass and 50% by mass.

12. The superhydrophobic film according to claim 11, wherein a surface roughness Ra of the superhydrophobic film is 30 nm or more.

13. The superhydrophobic film according to claim 12, wherein the surface roughness Ra of the superhydrophobic film is 40 nm or more.

14. The superhydrophobic film according to claim 11, wherein a visible light transmittance of the superhydrophobic film is 80% or more.

15. The coating composition according to claim 1, wherein the solvent comprises at least one selected from the group consisting of diacetone alcohol (DAA), propylene glycol monomethylether acetate (PGMEA), butyl acetate (BA), isopropyl alcohol (ISA), diisobutyl ketone (DIBK), and hexyl acetate (HA).

* * * * *